(12) United States Patent
Wallenius

(10) Patent No.: US 6,526,134 B1
(45) Date of Patent: Feb. 25, 2003

(54) CALL SET-UP BY AN INTELLIGENT NETWORK

(75) Inventor: Jukka Wallenius, Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/297,662

(22) PCT Filed: Feb. 28, 1997

(86) PCT No.: PCT/FI97/00134

§ 371 (c)(1),
(2), (4) Date: Jul. 8, 1999

(87) PCT Pub. No.: WO98/21899

PCT Pub. Date: May 22, 1998

(30) Foreign Application Priority Data

Nov. 14, 1996 (FI) .................................................. 964571

(51) Int. Cl.[7] .............................................. H04M 3/42
(52) U.S. Cl. .......................... 379/201.01; 379/207.02; 379/221.08; 379/221.09; 370/259
(58) Field of Search ....................... 379/201.01, 207.02, 379/221.08, 221.09, 221.12, 230; 370/259

(56) References Cited

U.S. PATENT DOCUMENTS

| | | | | |
|---|---|---|---|---|
| 5,404,396 A | * | 4/1995 | Brennan | 379/157 X |
| 5,566,235 A | * | 10/1996 | Hetz | 379/221 X |
| 5,664,102 A | * | 9/1997 | Faynberg | 709/246 |
| 5,835,583 A | * | 11/1998 | Hetz et al. | 379/219 X |
| 5,920,618 A | * | 7/1999 | Fleischer, III et al. | 379/207 |
| 5,963,630 A | * | 10/1999 | Dabbs et al. | 379/201 |
| 5,999,610 A | * | 12/1999 | Lin et al. | |

FOREIGN PATENT DOCUMENTS

| | | |
|---|---|---|
| EP | 0725525 | 8/1996 |
| WO | 95/18503 | 7/1995 |
| WO | 95/22231 | 8/1995 |
| WO | 96/08909 | 3/1996 |

* cited by examiner

*Primary Examiner*—Creighton Smith
(74) *Attorney, Agent, or Firm*—Pillsbury Winthrop LLP

(57) ABSTRACT

In accordance with the invention, at least at one exchange at least one state model or a service-specific portion of the state model, such as a call segment is formed for each service associated with the same party (A, B) of the same call, with which portion a connection to the control point of the intelligent network service is operatively associated.

18 Claims, 4 Drawing Sheets

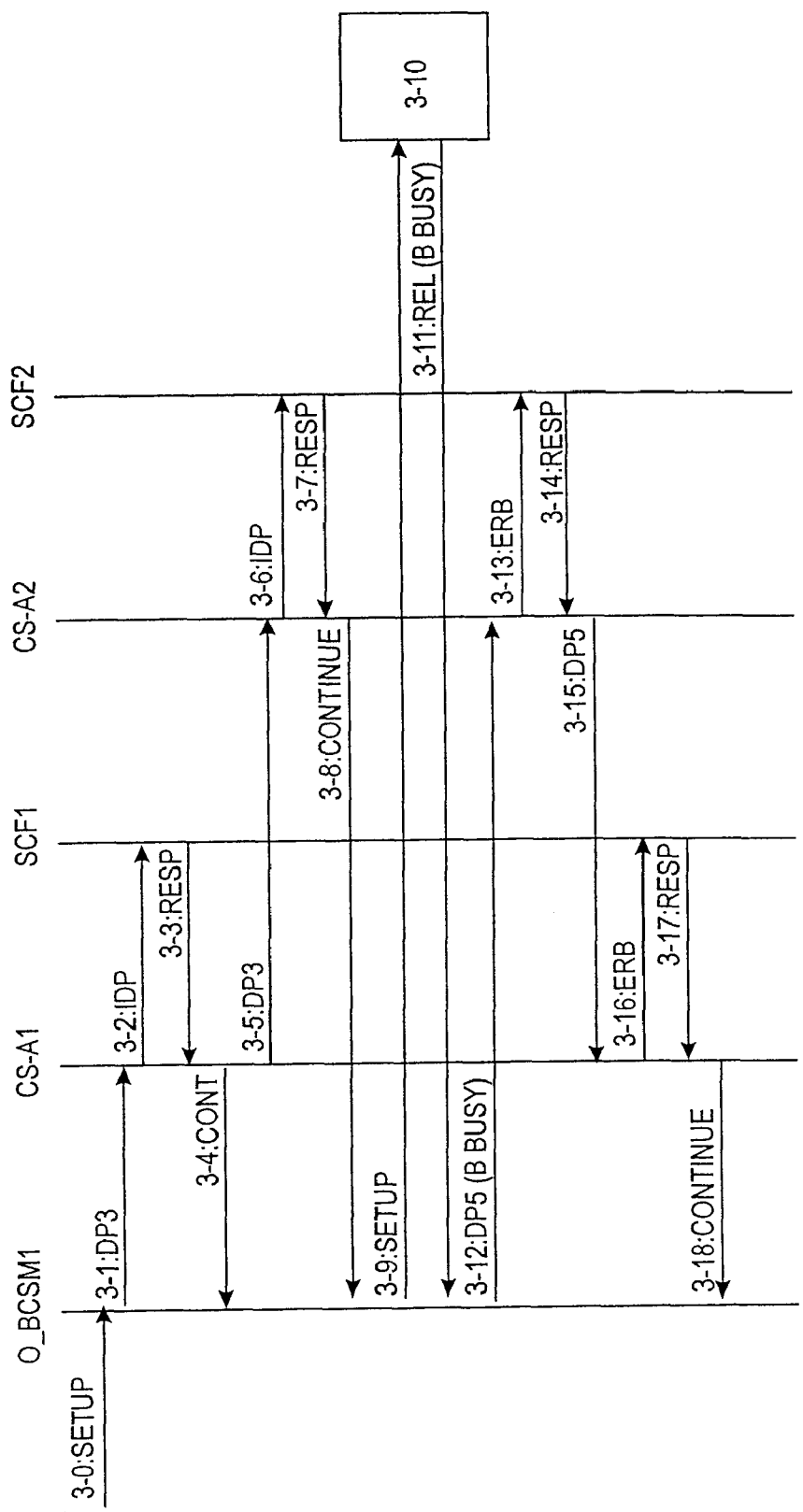

CALL SET-UP BY AN INTELLIGENT NETWORK

BACKGROUND OF THE INVENTION

The invention relates to a mechanism that improves the operation of an intelligent network for setting up calls and producing services for the subscriber.

FIG. 1A shows the parts of prior art call set-up essential to the invention. A call is transmitted from A subscriber to B subscriber. A subscriber may be, for example, a user of an ordinary subscriber unit, a subscriber of a public branch exchange network PBX1 or a mobile subscriber connected via a mobile station exchange PLMN (Public Land-based Mobile Network) and a base station subsystem BSS. A call may be transmitted e.g. from A subscriber via the first exchange PBX1, a first exchange EXC1, a public integrated services network PISN, a second exchange EXC2 and a second exchange PBX2 to B subscriber. The exchange EXC1 or EXC2 is the most important part of FIG. 1 for the invention.

By means of an intelligent network (IN), a subscriber of a telecommunication network—such as a wired network or a mobile telephone network—is provided with a great number of different services. These services are e.g., a private numbering plan PNP, which enables the use of private numbers, and, a personal number in which users can only call to subscribers belonging to the same group. A specific numbering block is defined for PBX subscribers in the numbering domain of the exchange. One example of this kind of an intelligent network is described in recommendations of ITU-T Q-1200 series, of which Q-1210–Q-1219 define the set of features which is known as capability set 1 and correspondingly, Q-1220–Q-1229 define the set of features known as capability set 2. In the present invention, an improvement is put forth to the call set-up mechanism presented in recommendation Q-1214. The invention utilizes the solution shown in AIN Release 2 for setting up several controlling connections, making it compatible with capability set 2 architecture and entities.

The basic call state model BCSM defined in connection with the intelligent network describes different stages of call control and includes the places where call control can be interrupted for starting an intelligent network service. It identifies the event detection points in the call and connection process where service logic entities of the intelligent network can have an interactive relationship with basic call and connection management features.

Referring now to FIG. 1B, at the exchange, call set-up is divided into two parts, the call set-up at the input side and the call set-up at the output side. Input and output sides are collectively referred to as half-calls or call controls. Call control at the input side is connected to services of A subscriber and call control at the output side is connected to services of B subscriber. Corresponding state models are O-BCSM=Originating Basic Call State Model and T-BCSM=Terminating Basic Call State Model. A CS (CallSegment) corresponds to one call. A Feature Interaction Manager FIM is drawn between the state models O-BCSM/T-BCSM and the call segments CS. In conventional call set-up, without the help of an intelligent network, exchanges make independently all the deductions relating to call routing. Intelligent network architecture includes one or more service control points (SCP) which are also known as SCF elements (Service Control Function). An SCF element gives call set-up instructions to the exchange, or the exchange may ask the SCF element for call set-up instructions, in which case it controls either one or both of the call segments CS, that is, either the output side or the input side. This is called a controlling connection. In FIG. 1B this is illustrated with a two-way arrow underneath the SCF. Only one SCF can control one half-call by a controlling connection. A controlling connection means that there is an ongoing session between the half-call and the SCF and at this session the SCF may give instructions that will change the call set-up. This means that there is an ongoing call, it has a TCAP connection (Transaction Capabilities Application Part) and by means of it additional information can be inquired or additional instructions can be received. The controlling connection may, have an effect on call set-up. Therefore, if at some stage of the call set-up, the interface of B subscriber is found to be busy, the call can be directed to an alternative number, for example.

A problem with capability set 1 and capability set 2 intelligent network architecture is that no more than one active, controlling connection can be associated with the same half-call. A practical example of such services could be a private numbering plan or a personal number. Two or more of these services cannot thus be activated by known intelligent network mechanisms for one half-call (for the same exchange) at the same time. The problem it causes to the provider and user of the service is that specific types of services cannot be implemented for the same subscriber at the same exchange at the same time.

As according to prior art, only one controlling connection may be associated with an incoming or outgoing call, a straightforward solution would be to establish such a state model where the incoming and/or outgoing half-call is associated with several controlling connections, that is, connections to the intelligent network service control point SCF. The problem with this straightforward solution is, however, that it would result in several changes to the software of the exchange as the state model of the call would have to be changed.

BRIEF DESCRIPTION OF THE INVENTION

The object of the invention is thus to develop a method for producing services so that the aforementioned problems associated with production of several simultaneous services can be solved. The objects of the invention are attained with the method which is characterized by what is stated in the characterizing part of claim 1. The dependent claims relate to the preferred embodiments of the invention.

The basic idea of the invention is that in the call control mechanism, a connection is not necessarily directed to the outgoing half-call or to the next network element, but an incoming call can be circulated within the same exchange a number of times equalling the number of controlling connections needed to the intelligent network. The same idea can be expressed and realized also so that in the call control mechanism of the exchange, call state models, that is, pairs of virtual half-calls, are duplicated. A controlling connection and thus a different service may be associated with each virtual half-call.

By duplicating call state models (instead of several controlling connections being derived from one state model), specific advantages are attained. First, the art of the invention requires only small changes to the software of the exchange as it is easier to duplicate the same kind of state models than to form a new state model from which several controlling connections can be derived. The mechanism of the invention does not require changes to the interfaces of the state models because existing state models—software and data elements—can be used essentially as such. The reliability of the exchange will be improved by keeping the changes small and by restricting them to accurately specified areas in comparison with a solution where a completely new state model were established. The mechanism of the invention can also be expanded easily as the number of controlling connections has no fixed upper limit.

The practical implementation of the invention can be further simplified if it is found out that instead of duplicating state model O-BCSM and/or T-BSCM, only the call segments CS can be duplicated. The duplication of only the speech segments is simpler (consumes less resources) than the duplication of whole state models.

BRIEF DESCRIPTION OF THE FIGURES

The invention will now be explained in more detail in connection with preferred embodiments, with reference to the appended drawings, where:

FIG. 3 is an exemplary signalling diagram illustrating the invention;

DETAILED DESCRIPTION OF THE INVENTION

Figure 1A:
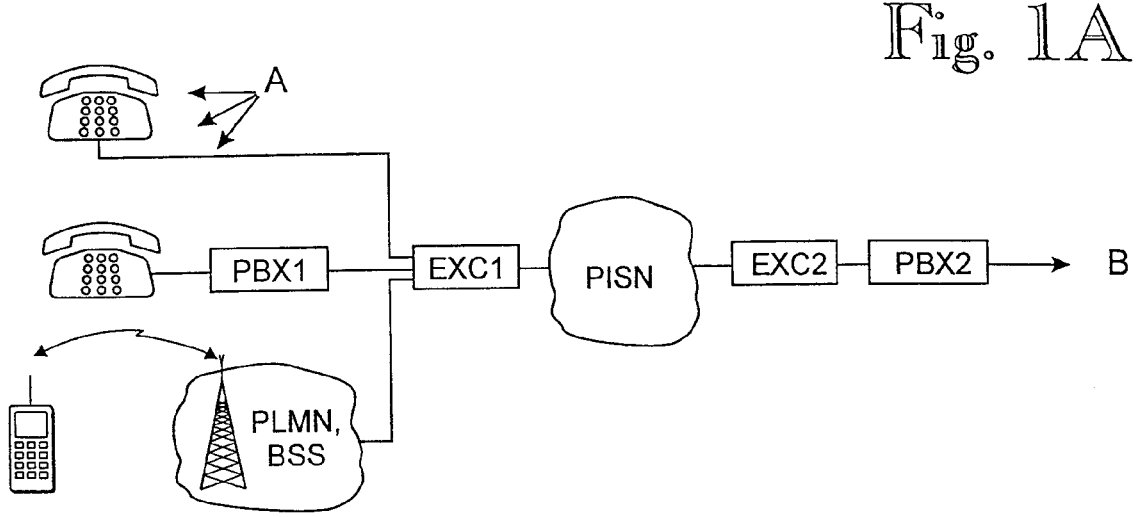
FIG. 1A illustrates the parts essential for the invention in a prior art call set-up.
Figure 1B:
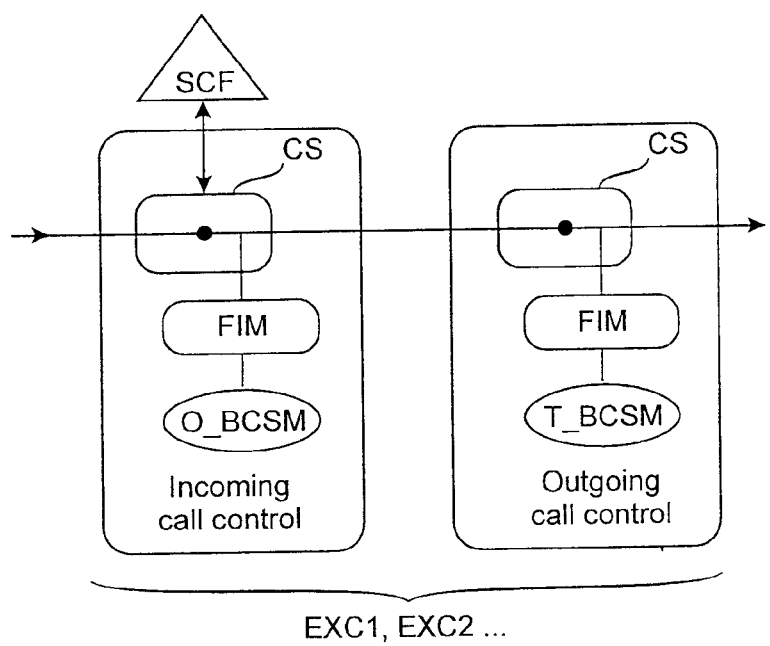
FIG. 1B shows a schematic view of a call state model and call control by an intelligent network.
Figure 2A:
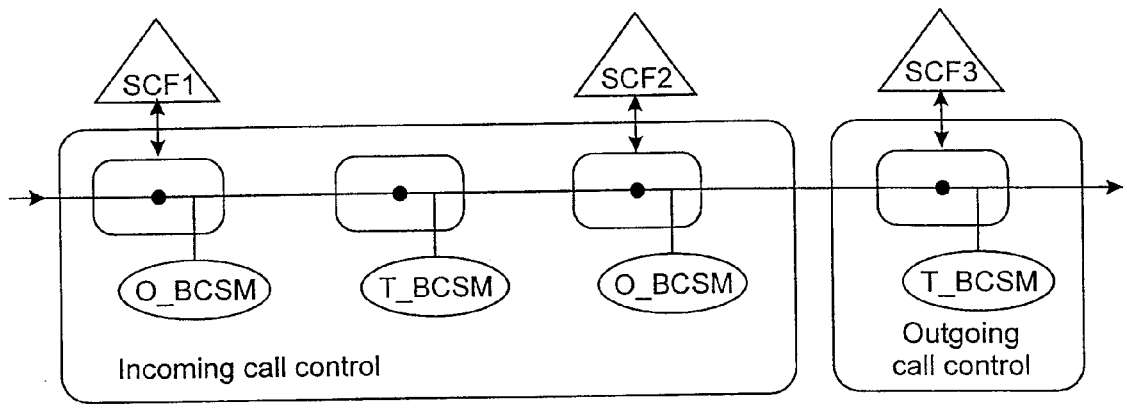
FIG. 2A illustrates the principle of the call set-up mechanism of the invention.

FIG. 2A illustrates the principle of the call set-up mechanism of the invention. The connection is not necessarily directed to the incoming half-call or to the next network element, but an incoming call may be circulated within the same exchange a number of times equalling the number of controlling connections needed to the intelligent network. The idea of the invention has been implemented in such a manner that in the call control mechanism of the exchange, call state models, that is, pairs of virtual half-calls are duplicated. A controlling connection and thus a different service may be associated with each virtual half-call.

Figure 2B:
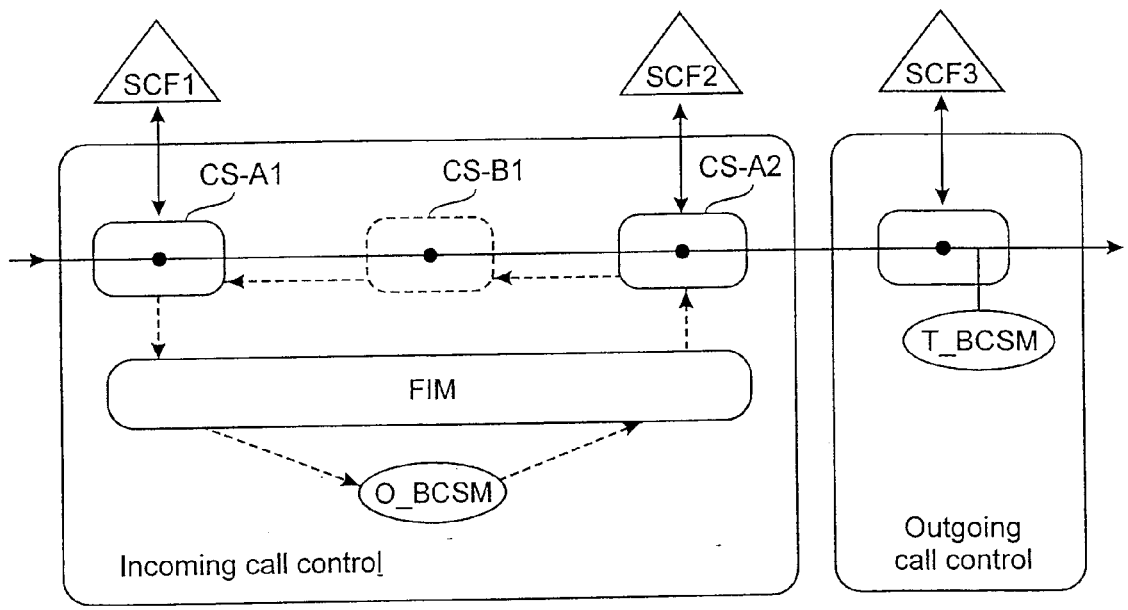
FIG. 2B shows an advanced modification of the arrangement of FIG. 2A.

FIG. 2B shows an advanced modification of the arrangement of FIG. 2A. This modification is based on the observation that instead of duplicating state model O-BCSM and/or T-BSCM, only the call segments CS can be duplicated, of which segments two, CS-A1 and CS-A2, can be seen in this example. The call segment CS-B1 of the inverse direction is shown with broken lines between them. This is a result of call segments of call control being generally arranged so that a call segment of the incoming call control is followed by a call segment of the outgoing call control, and vice versa. In the place of the call segment indicated with broken lines, an adapter function only can be placed for making interfaces of two parallel call segments compatible. In case parallel call segments (associated with an incoming or outgoing call) are adapted to be connected directly to one another, the call segment CS-B1 indicated with broken lines can be omitted.

The duplication of only the call segments CS will provide (in comparison with the duplication of whole state models) the advantage that the duplication of complicated and resource-consuming software is avoided and call segments, which contain mainly parameter data and which consume relatively little resources, can be duplicated.

According to the invention, the feature interaction manager FIM should be supplemented so that more than one call segment may be associated with it, in this example CS-A1 and CS-A2. In the ITU-T intelligent network recommendations mentioned above, the functions of the FIM include e.g. the maintenance of information on mutual compatibility of various services. According to prior art, the FIM is able to adapt to one another only basic services of the network and at most one such intelligent network service that will start a controlling connection. (Furthermore, the FIM may maintain compatibility with so-called monitoring services.) For adapting the services, the feature interaction manager FIM has a connection to a parameter database (not shown). On the basis of this information, the FIM knows which services are possibly incompatible with some other services.

According to the invention, information is also added to the database on how different types of services are to be placed in a chain (that is, in which order the call segments associated with them are to be placed and in which order they report about encountering the detection point). According to the invention, information is also added to the database on the mutual priority of the same types of services. On the basis of this information, the feature interaction manager FIM has information on which order different types of services should be chained. Also, the feature interaction manager FIM has information on which order the call segments receive information about encountering the detection point of events from a specific direction (input or output side).

For example, for mutually different services—such as credit card services and conference services—the mutual order of services is defined in the feature interaction manager FIM (or in a database associated with it). A priority is effective between two same call types determining which service first receives information about encountering the detection point (such as a release event.) For example, a call list service and a personal number service can be chained so that in a busy situation, the personal call service can first try to route the call to an alternative number which is used in a busy situation; but if the subscriber does not have an alternative number, information on encountering the busy detection point is transmitted to a call list service with a lower priority, which may, in turn, try to set up a call to some other number of the same subscriber or possibly of a different subscriber.

Another example is a situation where a charging service has been connected earlier to the call which service has triggered the detection point and after this a conference call is connected to the same call. The feature interaction manager FIM has information on the allowed service combinations and it places the calls in a chain into a sensible order, for example, the call segment of the conference call should be placed in chain before the call segment of the charging service so that the call segment of the charged service can detect the charging messages received from the network before they are transmitted to the call segment of the conference call.

Referring now to FIG. 3, one possible chain of events is described in connection with a call received at the exchange in connection with a call setup request. At stage 3-0 a call set-up request is received at the exchange, that is, a Setup message from A subscriber or from a preceding exchange. The call state model O-BCSM1 associated with an incoming half-call detects that it has to retrieve call set-up instructions from the SCF1. At stage 3-1, the detection point DP (O__Analyzed Information) is encountered as a result of digit analysis.

As a result of encountering this detection point, the first call segment CS-A1 of the chain is formed of the state model of the call at the input side via the FIM. At stage 3-2 the first controlling SCF connection is triggered by sending an IDP message (Initial Detection Point) to the SCF1. At stage 3-3 the SCF1 sends a response RESP which contains call set-up instructions, such as a new number and so on. At this stage the SCF1 has given a permission to continue call set-up (RESP and CONT). The state model of the input side detects that the second SCF connection should also be triggered from this detection point.

At this stage in the prior art call set-up, the connection would be directed from this exchange to the next exchange, to the switch or to the subscriber. According to the invention, call set-up is supplemented so that call set-up is circulated within the same exchange a number of times equalling to the number of different services associated with the same call. At stage 3-5 an O__Analyzed Information message is sent to CS-A2 which establishes a second controlling SCF connection with the SCF2 at stage 3-6. Stages 3-7 and 3-8 correspond to stages 3-3 and 3-4. At stage 3-9 call control and output state model is started by a SETUP message. At stage 3-9 the call is routed to the exchange of B subscriber. Stage 3-10 describes the activity outside the exchange which shows (in this example) that B subscriber is busy. At stage 3-11 the busy situation is reported to the call control and state model of the input side. At stage 3-12 the detection point DP (O__Busy) is met. The encounter of the detection point is reported to the CS-A2 which may report the encounter of the detection point to the SCF2. At stage 3-13 the SCF2 finds out the busy detection point has been met, to which it can give instructions which change call handling. (It is also possible that the SCF2 is not interested in that the detection point has been encountered.) If the SCF2 does not give instructions that will change call set-up but it allows call handling to continue as normal, the encounter of the busy detection point is reported to the CS-A1 at stage 3-15. Stages 3-16 and 3-17 correspond to stages 3-13 and 3-14.

Each control function SCF1, SCF2, etc. on the chain can thus detect call release and give alternative call set-up instructions via O-BCSM or T-BCSM for routing the call to an alternative service, for example. Call release does not then propagate backwards in the chain but it stays at the point which call release had reached and where the SCF has reacted to it.

Before a connection is established, it is not necessarily known if it will be a controlling connection or not. This is generally known only from that the SCF sets an EDR (Event Detection Point Response required) detection point. According to one embodiment of the invention, there is information in the static triggering data of the detection points, that is, in the triggering data if a controlling connection may be established as a result of the required SCF inquiry. In this way it is possible to be prepared for a future second controlling connection and a second state model or call segment can be formed.

According to a further embodiment of the invention, information is defined in the data of the subscribers subscribing to IN services which require controlling SCF connections. This information may have an effect on call routing so that according to this information, a second state model or call segment is prepared from which other IN services are controlled. The grounds for this embodiment are as follows. A subscriber may have services of several subscribers. It is thus necessary to be prepared for a new controlling connection to be established during the conversation state. It is assumed, for example, that the subscriber is calling a personal number having a possibility for rerouting. If the subscriber has booked a conference call or other calls to be activated later, this information can be utilized. Thus it is possible to avoid a situation in which the number translation service would prevent the conference call from being activated later.

Figure 4A:
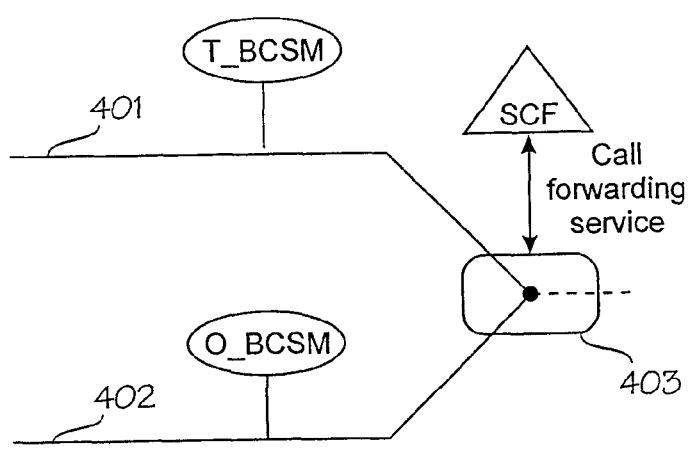
FIG. 4A illustrates restrictions of capability set 1 and capability set 2 intelligent network architecture for call control, for example.

FIG. 4A illustrates restrictions of capability set 1 and capability set 2 intelligent network architecture for call forwarding. Two passive branches, that is, connections to the subscriber, are connected to the connection point of the call segment. At the beginning of the chain of events, a call is made to B subscriber (for which call forwarding is switched on), and the call is handled at the exchange as a terminating call. From the exchange of B subscriber the call is forwarded as an originating call. An upper branch 401 illustrates a terminating call and a lower branch 402 to which O-BCSM is connected describes a call forwarded from the subscriber. The T-BCSM mechanism is used for the subscriber for setting up a terminating call. This mechanism checks, for example, whether the subscriber has paid the bill and in the positive case the call is switched to the subscriber and an outgoing call tone is produced for the calling subscriber. Call forwarding is thus handled as a subscriber-originating call from the exchange of the forwarding subscriber. In the CS2 intelligent network architecture of FIG. 4A, the both state models (T-BCSM and O-BCSM) have the same SCF connection via the same call segment 403 to which the branches 401 and 402 of the call are connected. If a controlling connection is formed of the prior art call forwarding service, any other controlling connection can no more be connected to the terminating call or to the originating portion.

Figure 4B:
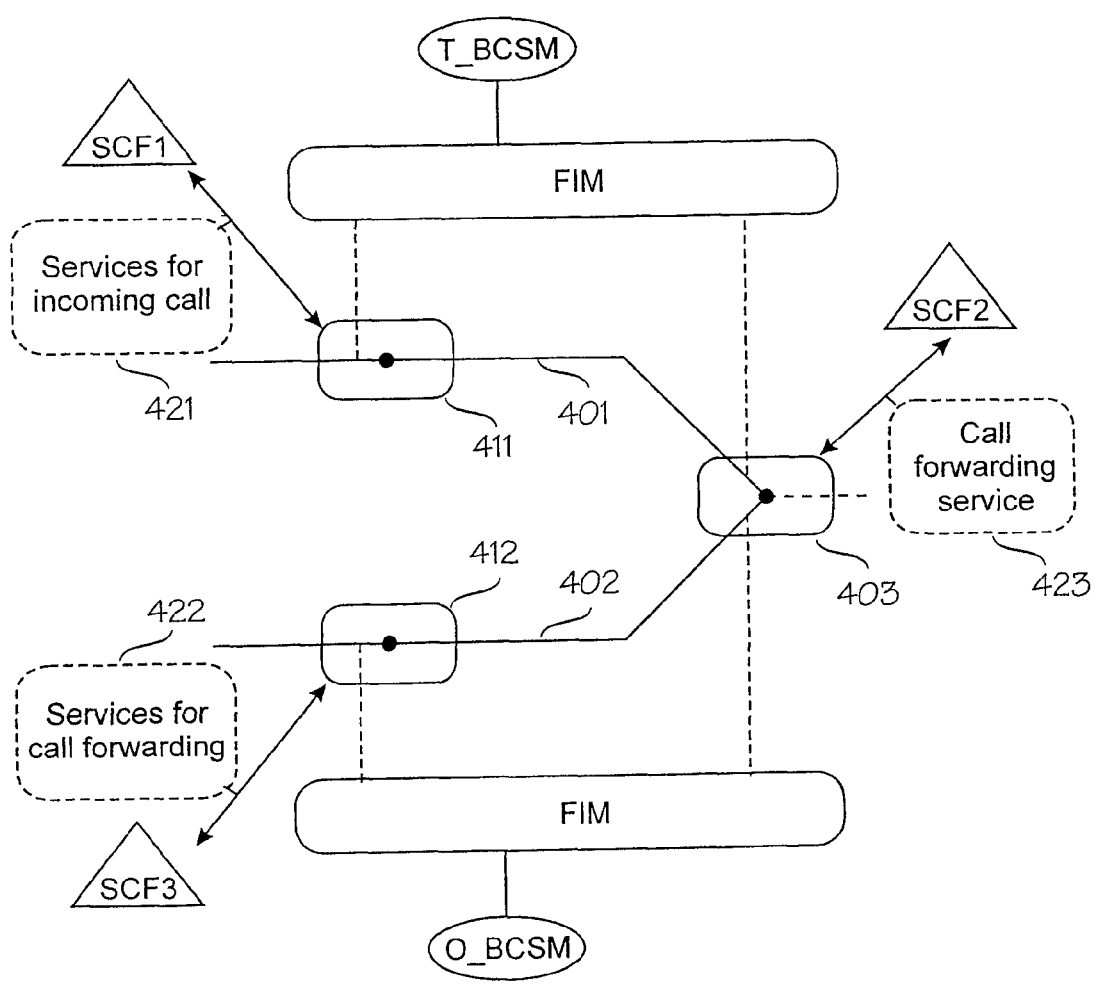
FIG. 4B shows how different services can be combined in the mechanism of the invention.

FIG. 4B similarly shows how different services (in this example call forwarding and conference call) can be combined in the mechanism of the invention. The services indicated with reference 421 include services of a terminating call. These services are e.g. a checking service of terminating calls or a charging service of terminating calls which measures calling time. One possible service is a so-called terminating call screening which checks the right of B subscriber to receive calls from A subscriber.

The services indicated by reference 423 are associated with the call forwarding service via the call segment next in chain. A lower branch 402 is formed for C subscriber on the basis of the call forwarding number obtained from the SCF2. From this forwarding call portion, i.e. from the branch 402, a new controlling SCF connection can be started for the SCF2, the services associated with which are shown with reference 423. For example, the number of C subscriber, which is possibly a personal number or some other intelligent network number, can be translated with these services into a number identifiable by the network. For this purpose, a second call segment 412 is formed for the third SCF connection to the SCF3. A multiparty call segment and branch-specific call segments have for one branch the same state model T-BCSM of the input side. The use of the feature interaction manager FIM and the duplication of call segment makes it possible to trigger the second service at the input side from a passive branch of the multiparty call segment (establishing an SCF connection).

When comparing FIGS. 4A and 4B, it can be seen how the art of the invention enables a call forwarding number to be a personal number or any other intelligent network number which requires number translation in the SCF. The arrangement of a specific call segment for each service according to the invention provides the advantage that after a controlling connection is established by the services of terminating calls, it is possible to trigger a call forwarding service, for example, which will direct the call to another number. In the method of the invention, a separate service can be triggered from each passive branch to the SCF and the controlling connections may be formed of them. The method of the invention enables, for example, that the subscribers taking part in a conference call are retrieved by using an intelligent network service number and this number is translated by a controlling SCF connection triggered from the same exchange. As in addition to the forwarding service call segment, a number translating call segment is also associated with the state model (O-BCSM) of the call at the output side which handles the call forwarded from the subscriber, the invention makes it possible in the call forwarding service, for example, that the call forwarding number provided by the SCF is the intelligent network service number which is translated by the SCF connection triggered from the same exchange.

The basic idea of the invention is thus that within the same exchange for each service associated with the same party of the same call a separate state model or preferably only a part of the state model is formed, from which portion a connection is established to the control point SCF of the intelligent network service. In the capability set 1/capability set 2 intelligent network architecture complemented in accordance with the invention, the suitable state model part is a call segment CS. It will be evident to those skilled in the art that with the development of the art, the basic idea of the invention may be realized in various ways. The invention and its embodiments are therefore not restricted to the examples described above but they may vary within the scope of the claims.

What is claimed is:

1. A method for providing intelligent network services to a call having at least two parties, the call comprising an incoming call control and an outgoing call control, the method comprising:

connecting multiple intelligent network services to at least one of the at least two parties of the call;

modeling at least one of the incoming call control and the outgoing call control by a state model;

operatively associating the modeled call control with a connection to a service control point of an intelligent network;

forming at least one service-specific portion of the state model for each of the multiple intelligent network services; and operatively associating the at least one service-specific portion with a connection to the service control point of the intelligent network.

2. A method according to claim 1, further comprising forming at least one additional service-specific portion of the state model in preparation for at least one future service before a need for forming the at least one additional service-specific portion arises.

3. A method according to claim 2, further comprising:

maintaining information on subscribers subscribing to intelligent network services requiring controlling connections; and using the information for call routing.

4. A method according to claim 3, wherein the using comprises preparing at least one additional service-specific portion of the call state model configured to control other intelligent network services.

5. A method according to claim 1, wherein each service-specific portion is a call segment.

6. A method according to claim 1, further comprising modeling at least one of the incoming call control and the outgoing call control by several service-specific portions in a direction in question, consecutive state models or service-specific portions having a service-specific portion therebetween in a direction inverse to the direction in question.

7. A method according to claim 1, wherein the intelligent network service include a personal number.

8. A method according to claim 1, wherein the intelligent network services include a credit card service.

9. A method for providing intelligent network services to a call having at least two parties, the call comprising an incoming call control and an outgoing call control, the method comprising:

connecting multiple intelligent network services to at least one of the two parties of the call;

modeling at least one of the incoming call control and the outgoing call control by a state model;

operatively associating the modeled call control with a connection to a service control point of an intelligent network;

forming at least one state model for each of the multiple intelligent network services; and operatively associating the at least one state model with a connection to the service control point of the intelligent network.

10. A method according to claim 1 or 9, wherein to avoid contradictory services, each state model or service-specific portion informs a next state model or service-specific portion in a direction of propagation of the call set-up about events to which the service control point is to react.

11. A method according to claim 1 or 9, further comprising modeling at least one of the incoming call control and the outgoing call control by several state models or by a plurality of service-specific portions in a direction in question, each two consecutive state models or service-specific portions having essentially only an adapter function therebetween that interconnects interfaces of two similar state models or service-specific portions.

12. A method according to claim 1 or 9, further comprising forming the service-specific portion of the state model in response to having a controlling connection in an existing state model and detecting, in a detection point, a need to establish further a controlling connection.

13. A method according to claim 1 or 9, further comprising:

providing a feature interaction manager between the state model and the service-specific portion;

associating information on mutual compatibility of the services with the feature interaction manager; and further associating information relating to the order in which different types of services are to be placed in a chain of mutual priority with the feature interaction manager.

14. A method according to claim 13, further comprising associating the feature interaction manager with information on the mutual priority of the intelligent network services of similar type.

15. A method according to claim 1 or 9, wherein the intelligent network services include at least one of call forwarding and conference call.

16. A method according to claim 9, further comprising modeling at least one of the incoming call control and the outgoing call control by several state models in the direction in question, consecutive state models having a state model therebetween in a direction inverse to the direction in question.

17. A method according to claim 9, wherein the intelligent network services include a personal number.

18. A method according to claim 9, wherein the intelligent network services include a credit card service.

* * * * *